United States Patent
Jefferies et al.

(10) Patent No.: US 9,252,587 B2
(45) Date of Patent: Feb. 2, 2016

(54) AUTOMATIC RESET DISCRIMINATION SYSTEM AND METHOD FOR A SELF POWERED ELECTRONIC PROTECTION DEVICE

(75) Inventors: Kevin Jefferies, Raleigh, NC (US); Philippe Guibert, Isere (FR); Pablo Garcia Viano, Eybens (FR)

(73) Assignee: SCHNEIDER ELECTRIC USA, INC., Schaumburg, IL (US)

( * ) Notice: Subject to any disclaimer, the term of this patent is extended or adjusted under 35 U.S.C. 154(b) by 35 days.

(21) Appl. No.: 13/813,866

(22) PCT Filed: Jan. 9, 2012

(86) PCT No.: PCT/US2012/020604
§ 371 (c)(1),
(2), (4) Date: Feb. 1, 2013

(87) PCT Pub. No.: WO2012/099733
PCT Pub. Date: Jul. 26, 2012

(65) Prior Publication Data
US 2013/0135778 A1    May 30, 2013

(30) Foreign Application Priority Data
Jan. 17, 2011    (EP) ................................. 11290020

(51) Int. Cl.
*H02H 3/06*    (2006.01)
*H02H 3/08*    (2006.01)
(Continued)

(52) U.S. Cl.
CPC ................ *H02H 3/085* (2013.01); *H02H 3/06* (2013.01); *H02H 1/06* (2013.01); *H02H 7/085* (2013.01); *H02H 7/09* (2013.01)

(58) Field of Classification Search
CPC .............................. H02H 3/06; H02H 3/085
USPC ........................................................... 361/71
See application file for complete search history.

(56) References Cited

U.S. PATENT DOCUMENTS 3,685,035 A    8/1972    McClain et al.
3,875,464 A    4/1975    Gary et al.
(Continued)

FOREIGN PATENT DOCUMENTS

WO    WO9903184    1/1999

OTHER PUBLICATIONS

International Search Report corresponding to co-pending Patent Application Serial No. PCT/US2012/020604, United States Patent Office, dated May 16, 2012; (4 pages).
(Continued)

*Primary Examiner* — Thienvu Tran
*Assistant Examiner* — Tien Mai
(74) *Attorney, Agent, or Firm* — Locke Lord LLP

(57) ABSTRACT

An apparatus and method for selectively automatically resetting an electronic protection device. The electronic protection device may protect a motor load by disconnecting the load from a power source when the current drawn by the load exceeds a threshold, when the power source suffers from a phase imbalance or phase loss, or when another condition is detected. The electronic protection device discriminates between different types of fault conditions and determines whether to suppress an automatic reset function of the device. The electronic protection device includes a reset energy storage device for automatically resetting the electronic protection device following a trip event using energy from the reset energy storage device. In operation, the electronic protection device detects a fault condition not calling for an automatic reset, then discharges the reset energy storage device and trips the electronic protection device before the reset energy storage device recharges.

19 Claims, 4 Drawing Sheets

(51) Int. Cl.
    *H02H 1/06*     (2006.01)
    *H02H 7/085*     (2006.01)
    *H02H 7/09*     (2006.01)

(56) References Cited

U.S. PATENT DOCUMENTS

| | | | |
|---|---|---|---|
| 4,597,025 A | 6/1986 | Rutchik et al. | |
| 5,332,986 A | 7/1994 | Wieloch | |
| 5,657,194 A | 8/1997 | Waltz | |
| 6,310,753 B1 * | 10/2001 | Dollar et al. | 361/93.2 |
| 7,398,423 B2 | 7/2008 | Reaume et al. | |
| 2003/0146725 A1 | 8/2003 | Griesemer et al. | |
| 2006/0143545 A1 | 6/2006 | Reaume et al. | |
| 2009/0027817 A1 | 1/2009 | Kamiyama et al. | |

OTHER PUBLICATIONS

International Written Opinion corresponding to co-pending International Patent Application Serial No. PCT/US2012/020604, United States Patent Office, dated May 16, 2012; (7 pages).

Examination Report for Application No. 11290020.4-1801 dated Oct. 11, 2014.

Extended European Search Report for Application No. 11290020.4-1231 dated May 30, 2011.

\* cited by examiner

AUTOMATIC RESET DISCRIMINATION SYSTEM AND METHOD FOR A SELF POWERED ELECTRONIC PROTECTION DEVICE

CROSS-REFERENCE TO RELATED APPLICATIONS

This application is a U.S. National Stage of International Application No. PCT/US2012/020604, filed on Jan. 9, 2012, which claims the benefit of European Patent Application No. 11290020.4, filed on Jan. 17, 2011, both of which are incorporated herein by reference in their entireties.

FIELD OF THE INVENTION

The present disclosure relates generally to electronic protection devices, and, more particularly, to a method for selectively resetting a self-powered electronic protection device.

BACKGROUND

Loads connected to electrical circuits can be damaged if the loads draw more current than they are configured to tolerate. For example, inductive motor loads that draw too much current from a power source can suffer from overheating, which shortens the motor life and can potentially break down the insulation in the motor windings. Additionally three-phase inductive motor loads configured to receive power from a polyphase AC power source can be damaged if the power source suffers from a phase loss or phase imbalance. A phase loss occurs when one phase of the current delivered by the polyphase power source is disconnected. A phase loss fault can occur due to a blown fuse or a discontinuous power wire in series with the conductor carrying the phase. A phase imbalance fault occurs when one or more of the phases of the current drop below some characteristic fraction of their nominal values. A phase loss fault and a phase imbalance fault can damage the motor load by causing the motor windings to draw current unevenly and heat unevenly, which is inefficient and shortens the life of the motor and potentially overheats the insulation of the motor windings. Therefore, an electronic protection device is conventionally used to protect the motor.

The electronic protection device can be configured to automatically reset following tripping of the electronic protection device. Electronic protection devices incorporating selective automatic reset functionality conventionally include an external power source for powering a memory or a logic circuit to provide a reset function following the tripping. The external power source provides power to logical aspects or memory aspects within the electronic protection device for storing the type of fault condition determined by the controller after the trip mechanism is actuated. A conventional electronic protection device having selective automatic reset functionality can then determine whether to automatically reset following a trip event based on the contents of the separately powered memory. But, conventional electronic protection devices require an external power source to provide selective automatic reset functionality. Providing a separate power source undesirably adds cost and current consumption to conventional electronic protection devices, and requires additional electronic components and circuitry.

BRIEF SUMMARY

Provided herein is an apparatus and method for operating an electronic protection device to provide selective automatic reset functionality without requiring an external power source. The apparatus for selectively automatically resetting an electronic protection device comprises a trip mechanism, a reset mechanism, and a controller. The trip mechanism can be an electromechanical device configured to separate two contacts to halt current flow to a contactor, and thereby causes the contactor to stop current from flowing to the protected load. For example, the trip mechanism can be actuated by the mechanical force generated from a trip actuator coil causing a solenoid to move responsive to a current flowing through the trip actuator coil. The trip actuator coil can be connected in series with a trip energy storage device, such as a capacitor, and a trip transistor. Providing a bias to the trip transistor causes the trip energy storage device to discharge through the trip actuator coil and thereby trip the trip mechanism. Similarly, the reset mechanism can be actuated by providing a bias to a reset transistor which causes a reset energy storage device, such as a capacitor, to discharge through a reset actuator coil.

Electronic protection devices providing a selective automatic reset capability are desirable as different forms of fault conditions require distinct responses. For example, a thermal fault can indicate an overloaded inductive motor load that simply needs some time to cool off, and an automatic reset may be desirable following a thermal (over-current) fault. However, phase imbalance or phase loss faults can indicate problems in the power supply circuit, such as a blown fuse or a discontinuous power line and generally do not therefore call for an automatic reset. Phase imbalance or phase loss faults generally require some action to be taken by a user to correct the problem in the power supply circuit, and aspects of the present disclosure provide for communicating the existence of the problem in the power supply circuit to the user by not automatically resetting the electronic protection device.

Aspects of the present disclosure provide an apparatus configured to selectively automatically reset an electronic protection device while requiring minimal cost, complexity, and current consumption to implement. The method disclosed herein does not require the addition of any electronic components to be implemented in an automatically resetting electronic protection device. Aspects of the present disclosure can be implemented in a solid state overload relay operated according to a controller. The controller is configured to monitor current drawn by a protected load from an AC polyphase power source. The controller includes a fault discrimination module that analyzes the monitored current to determine whether a fault condition has occurred, and to discriminate a type of fault condition. Based on the discriminated type of fault condition, the fault discrimination module determines whether to suppress an automatic reset function of the electronic protection device.

For example, the fault discrimination module can operate by suppressing the automatic reset function of the device when the discriminated type of fault condition is a phase loss fault or a phase imbalance fault. The fault discrimination module suppresses the automatic reset discrimination function by discharging the reset energy storage device shortly before tripping the trip mechanism. Following the discharging of the reset energy storage device, the trip mechanism is tripped before the reset energy storage device can be sufficiently recharged to have enough energy to enable to device to be automatically reset. In an implementation, the time delay between discharging the reset energy storage device and tripping the trip mechanism can be less than ten milliseconds or less than fifty milliseconds.

According to an aspect of the present disclosure, an automatic reset discrimination circuit is disclosed for automatically discriminating whether to automatically reset an electronic protection device following a tripping of the electronic protection device. The circuit includes: a trip mechanism, a reset circuit, and a controller. The trip mechanism can, when actuated, trip the electronic protection device by disconnecting a load protected by the electronic protection device from a power source. The reset circuit can include a reset mechanism and a reset energy storage device. The reset mechanism can include a reset actuator coil that, when actuated, can cause the reset mechanism to reset the electronic protection device and thereby reconnects the load to the power source. The reset energy storage device can be connected to the reset actuator coil. The controller can have a reset control output connected to the reset circuit. The controller can be configured to cause the reset circuit to actuate or, in response to detection of a fault condition not calling for an automatic reset of the electronic protection device, can cause the reset energy storage device to discharge to prevent the reset circuit from automatically resetting the electronic protection device.

According to an other aspect of the present disclosure, the controller of the automatic reset discrimination circuit can include a fault discrimination module for analyzing measurement signals indicative of an electrical characteristic of power drawn by the load from a plurality of current phases supplied by the power source. Furthermore, the detection of the fault condition not calling for an automatic reset can be carried out by the fault discrimination module. The fault discrimination module can be further configured to: analyze the measurement signals to detect a fault condition, discriminate a type of the fault condition, and determine whether to prevent the reset circuit from automatically resetting based on the discriminated type of the fault condition. The reset circuit can be prevented from automatically resetting the electronic protection by actuating the trip mechanism responsive to the discharge of the reset energy storage device before the reset energy storage device is recharged with an amount of energy sufficient to actuate the reset actuator coil. The reset circuit can further include a reset transistor. The reset transistor can have a gate connected to the reset control output of the controller, and the controller can be configured to cause the reset energy storage device to discharge through the reset actuator coil by biasing the gate of the reset transistor.

According to still another aspect of the present disclosure, the reset actuator coil can also be an actuator coil of the trip mechanism. The trip mechanism can be configured to actuate upon discharge of a trip energy storage device through the reset actuator coil such that current flows in a direction opposite to a direction of current flow through the reset actuator coil during the discharge of the reset energy storage device. Furthermore, the automatic reset discrimination circuit can be self-powered.

According to another aspect of the present disclosure, a method is disclosed for operating a selectively automatically resetting electronic protection device. The method can include: monitoring a characteristic of electricity associated with a load protected by the electronic protection device. The method can further include: charging a reset energy storage device configured to supply energy to a reset mechanism configured to automatically reset the electronic protection device. The method can further include: detecting a fault condition based on the monitored characteristic. The method can further include: analyzing the monitored characteristic to determine whether the fault condition calls for an automatic reset of the electronic protection device or does not call for an automatic reset of the electronic protection device. The method can further include: discharging the reset energy storage device responsive to the fault condition not calling for an automatic reset of the electronic protection device. The method can further include: in response to the discharging, causing the electronic protection device to trip before the reset energy storage device is recharged. By causing the electronic protection device to trip before the reset energy storage device is recharged, the method can thereby prevent an automatic resetting of the electronic protection device.

According to still another aspect of the present disclosure, the characteristic of electricity can be current and the monitoring can be carried out by measuring current drawn by the load from a plurality of phases of a polyphase alternating current (AC) electrical source. The electronic protection device can be a self-powered solid state overload relay. The reset energy storage device can be a capacitor, and the reset mechanism can include a reset actuator coil. Furthermore, the reset energy storage device can discharge through the reset actuator coil of the reset mechanism. The discharging can be carried out by closing a switch that completes a circuit that includes the capacitor and the reset actuator coil to cause the energy stored in the reset energy storage device to discharge through the reset actuator coil. Furthermore, the fault condition not calling for an automatic reset can be a phase loss fault condition or a phase imbalance fault condition. The method can also include: automatically resetting the electronic protection device by using the energy stored in the reset energy storage device responsive to the fault condition calling for an automatic reset of the electronic protection device. The fault condition calling for an automatic reset can be a thermal fault. Furthermore, causing the electronic protection device to trip can be carried out by closing a second switch that causes an actuator coil to actuate a trip mechanism of the electronic protection device using energy stored in a trip energy storage device.

According to yet another aspect of the present disclosure, a method is provided for inhibiting an automatic reset function of an electronic protection device. The electronic protection device can have a reset energy storage device for providing energy to a reset mechanism. The electronic protection device can be configured to be reset responsive to the reset energy storage device energizing the reset mechanism. The method can include: discharging energy stored in the reset energy storage device. The method can further include: responsive to the discharging, tripping the electronic protection device before the reset energy storage device is recharged. The discharging can be carried out by closing a switch that completes a circuit including the capacitor and an actuator coil. The reset energy storage device can be a capacitor, and the reset mechanism can include an actuator coil.

The present disclosure expressly contemplates combining any one or more of the disclosed systems, aspects, or methods in any permutation.

The foregoing and additional aspects and implementations of the present disclosure will be apparent to those of ordinary skill in the art in view of the detailed description of various embodiments and/or aspects, which is made with reference to the drawings, a brief description of which is provided next.

BRIEF DESCRIPTION OF THE DRAWINGS

The foregoing and other advantages of the present disclosure will become apparent upon reading the following detailed description and upon reference to the drawings.

DETAILED DESCRIPTION

Figure 1:
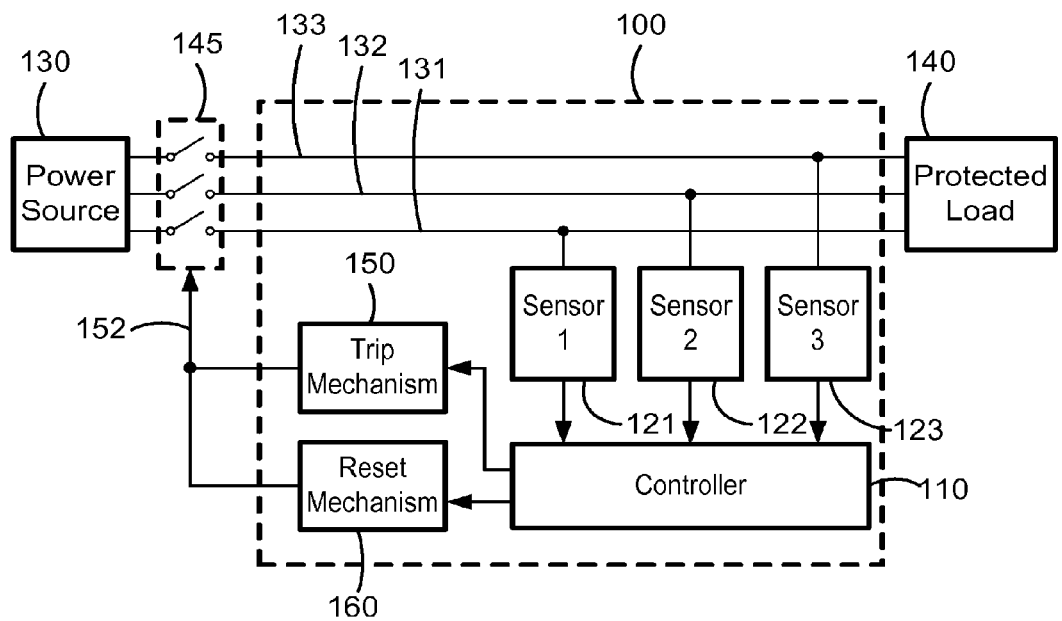
FIG. 1 is block diagram of an electronic protection device configured to provide protective functions to a protected load connected to a power source.

FIG. 1 is block diagram of an electronic protection device 100 configured to provide protective functions to a protected load 140 connected to a power source 130. The power source 130 can be a polyphase alternating current (AC) power source. The power source 130 can include three conductive lines (131, 132, 133) for providing three phases of a supply current, and can be arranged according to a delta wye configuration. In a configuration, the protected load 140 can be an inductive motor load. The electronic protection device 100 includes a first sensor 121, a second sensor 122, a third sensor 123, a controller 110, a trip mechanism 150, and a reset mechanism 160. The three sensors (121, 122, 123) can be configured to provide outputs indicative of an electrical characteristic monitored by the three sensors (121, 122, 123) to the controller 110. For example, the monitored electrical characteristic can be a current flowing through one or more of the three conductive lines (131, 132, 133) (e.g., electrical conductors) or a voltage between one or more of the three conductive lines and each other or a reference potential.

In a configuration of the electronic protection device 100, the first sensor 121 is connected to a first conductive line 131 of the power source 130 carrying a first phase of the supplied current. The first sensor 121 can, for example, be a current sensor for monitoring the current drawn by the protected load 140 from the first phase of the supplied current. The second sensor 122 is connected to a second conductive line 132 of the power source 130 carrying a second phase of the supplied current. The second sensor 122 can, for example, be a current sensor for monitoring the current drawn by the protected load 140 from the second phase of the supplied current. The third sensor 123 is connected to a third conductive line 133 of the power source 130 carrying a third phase of the supplied current. The third sensor 123 can, for example, be a current sensor for monitoring the current drawn by the protected load 140 from a third phase of the supplied current. The controller 110 receives the outputs of the three sensors (121, 122, 123). While the power source 130 is illustrated having three conductors carrying three phases of a supply current, the present disclosure applies to implementations having polyphase power sources with supply currents having more than three or fewer than three phases, such as a single phase power source.

The controller 110 is connected to the trip mechanism 150 and is configured to actuate the trip mechanism 150 responsive to detecting a fault event. Actuating the trip mechanism 150 disconnects the protected load from the power source 130 by activating a contactor 145. The contactor 145 is symbolically illustrated in the block diagram shown in FIG. 1 as a set of three switches operable according to a control signal 152 from the trip mechanism 150 or a reset mechanism 160 however the present disclosure is not limited to a contactor 145 including a switch. The contactor 145 can be a mechanical or electromechanical apparatus suitable for disconnecting the power source 130 from the load 140 according to the control signal 152. Similarly, the trip mechanism 150 and the reset mechanism 160 can be a mechanical or electromechanical apparatus suitable for communicating the control signal 152 to the contactor 145 according to signals received from the controller 110, such as the trip signal 222 and the reset signal 224 shown in FIG. 2. In an implementation, the control signal 152 communicated to the contactor 145 can be a steady current or voltage that operates to maintain the switches of the contactor 145 in a closed position and thereby maintain the connection between the power source 130 and the protected load 140. For example, the control signal 152 can be a bias applied to a transistor within the contactor 145, and the interruption of the control signal 152 can cause the transistor to be turned off. The contactor 145 can be configured to open its switches and thereby disconnect the protected load 130 from the power source 140 when the steady current or voltage received from the trip mechanism 150 is interrupted.

Figure 3:
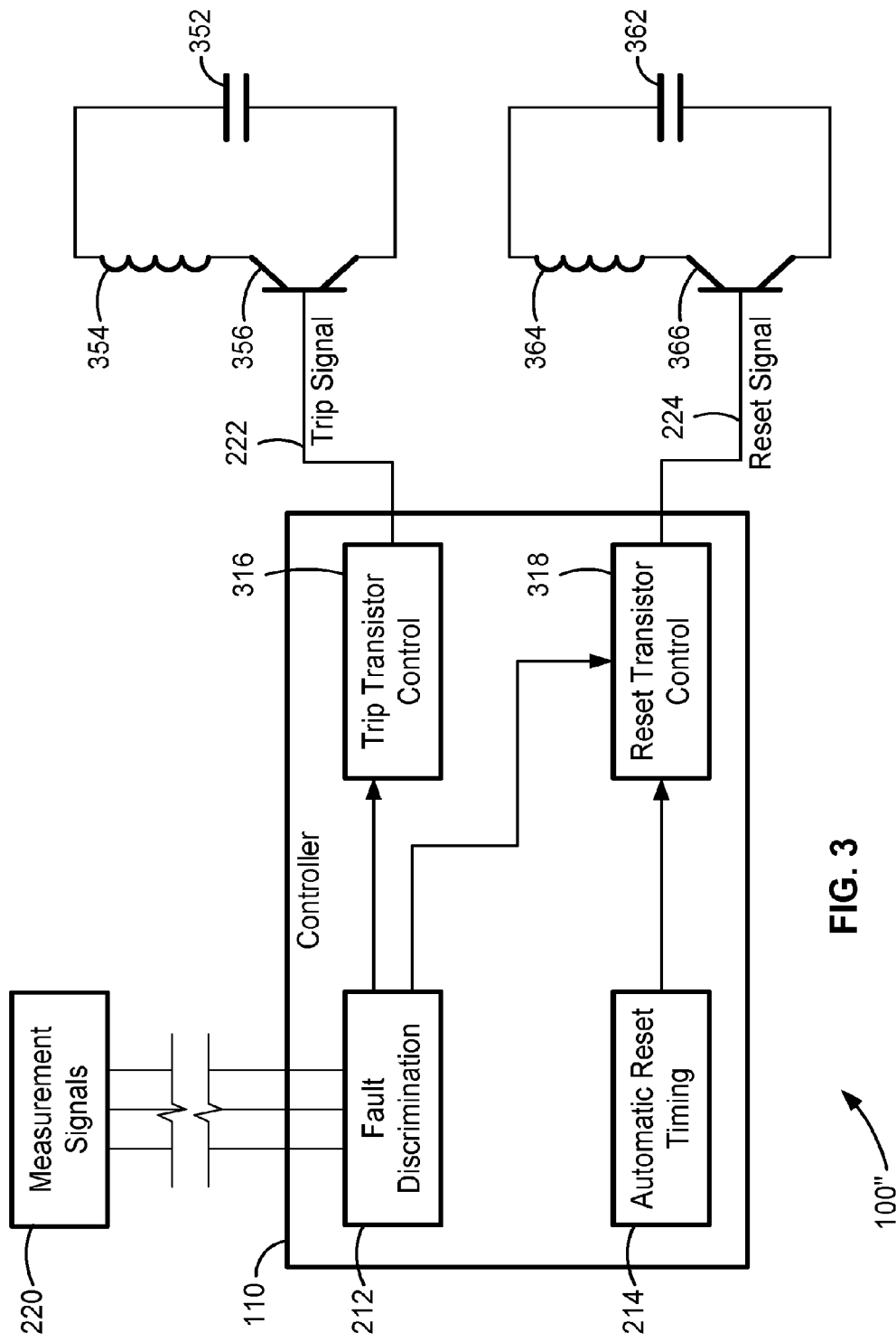
FIG. 3 illustrates a block diagram of an electronic protection device providing a selective automatic reset function and including a reset mechanism transistor and a trip mechanism transistor.

In an implementation of the present disclosure, the trip mechanism 150 can be actuated by sending current through an actuator coil, such as the trip actuator coil 354 shown in FIG. 3. The current can be sent through the trip actuator coil by discharging an energy storage device by biasing a transistor, such as the trip transistor 356 shown in FIG. 3, to complete a circuit including the energy storage device and the actuating coil. The trip actuator coil can be a portion of a solenoid, and the mechanical movement due to actuation of the solenoid can cause a mechanical lever, rod, linkage, or rotating element to open electrical contacts in the trip mechanism 150. Opening the electrical contacts in the trip mechanism 150 can cause the control signal 152 to be interrupted and thereby cause the contactor 145 to disconnect the protected load 140 from the power supply 130. The contactor 145 can operate to disconnect all phases of the power supply 130 from the protected load 140 simultaneously.

The controller 110 can be a microcontroller, an application specific integrated circuit (ASIC), a field programmable gate array (FPGA), or another electronic device suitable for receiving signals indicative of an electrical characteristic (e.g., current or voltage) of the power source 130. The controller 110 can analyze the received signals to determine whether a fault condition has occurred, and cause the trip mechanism 150 to actuate in response to determining whether the fault condition occurred. In an implementation of the electronic protection device 100, one or more of the three sensors (121, 122, 123) can be incorporated into the controller 110. For example, the controller 110 can include three inputs configured to receive voltages proportional to a current carried by the three conductive lines (131, 132, 133), and the voltages can be generated by measuring voltage drops across measurement burdens (e.g., resistors) for each of the conductive lines (131, 132, 133).

The measurements can be analyzed in the controller 110 according to techniques available in power system analysis and digital signal processing to detect a fault condition of the current supplied by the power source 130. For example, one or more of the measurements exceeding a thermal threshold value can indicate an overcurrent fault event or a thermal fault event. The thermal threshold value can be based on an aspect or feature of the protected load 140, on a nominal value of the monitored electrical characteristic, or on a user input. The nominal value of the monitored electrical characteristics can be based on, for example, an average or median value of the electrical characteristic. The measurements signals can also be compared to one another and to the nominal values for the measurements to detect fault conditions other than thermal faults. In an example implementation, a thermal fault can be indicated by a measurement of current for a phase of the supplied current exceeding 200% of the nominal current value for the phase and lasting for a duration of eight minutes, as specified in Underwriter's Laboratory standard 508 (UL 508). The detection of faults by the controller 110 can be implemented using an accumulator or an integrator to measure an amount of received current over a time duration and to detect a fault when a running accumulation of current over time exceeds a threshold value.

The measurements can be compared with one another to detect a phase imbalance fault condition. A phase imbalance can be determined to occur when the comparison between multiple phases indicates that one or more of the phases of the supplied current are not in a tolerance range. The tolerance range can be based on an aspect or feature of the protected load 140, on a nominal value of the monitored electrical characteristic, or on a user input. A phase imbalance fault can also be indicated by one or more of the phases falling below its nominal value by a percentage, which can be, for example, 60% of the nominal value for the monitored phase. A phase loss fault can be detected by determining whether one or more of the phase currents is below a loss threshold, which can be a threshold corresponding to current near zero in an implementation. Furthermore, in an implementation, fault detection and discrimination can be based on trends in the measurements over time, on comparisons between multiple phases of the supplied current, and on comparisons between the phases and one or more threshold values that can optionally be dynamically determined. Fault detection and discrimination can be based on measurements indicative of current or voltage in the conductive lines (131, 132, 133).

In an example operation of the electronic protection device 100, the power source 130 energizes the conductive lines (131, 132, 133) and one or more electrical characteristics of the power (e.g., current or voltage) delivered to the protected load 140 are detected using the three sensors (121, 122, 123). The controller 110 analyzes the electrical characteristic(s) monitored by the three sensors (121, 122, 123) and determines whether a fault event has occurred. Responsive to determining that a fault event has occurred, the controller 110 causes the trip mechanism 150 to actuate.

In an implementation, the electronic protection device 100 can be self powered, meaning that the electronic components of the electronic protection device 100 are powered by the same current or voltage that the electronic protection device 100 is monitoring. In other words, by self-powered, it is meant that the electronic protection device 100 does not have an independent power supply, but rather derives its power from the conductive line or lines (131, 132, 133) it is monitoring. In a configuration of the electronic protection device 100 incorporating aspects powered from direct current (DC) power, such as digital logic aspects or solid-state aspects, the electronic protection device 100 can be self powered. One or more of the conductive lines (131, 132, 133) of the power source 130 can be connected to a primary winding of a current transformer, and a secondary winding of the current transformer can be connected to a rectifier to supply DC power to the electronic protection device. A configuration where power is provided to the electronic protection device 100 from the same conductive line of the power source being monitored by the electronic protection device 100 is a self-powered configuration.

The electronic protection device 100 can be configured as an overload relay. The overload relay can be configured to monitor current drawn by the protected load 140 and to disconnect the protected load 140 using the contactor 145 when the monitored current indicates that a fault condition has occurred. The overload relay can be a solid state overload relay incorporating intelligent electronic elements having memory and logical circuitry.

An electronic protection device can be self-powered. For electronic protection devices incorporating electronic components operating under direct current (DC) power, a self-powered electronic protection device can include a rectifier connected to a secondary winding of a current transformer, with the monitored current flowing through a primary winding of the current transformer. A configuration where power is provided to the electronic protection device 100 from the same conductive line of the power source being monitored by the electronic protection device 100 is a self-powered configuration. Generally, self-powered devices do not draw power once the electronic protection device 100 is tripped, which generally halts current flow through the current rectifier either directly or indirectly.

Figure 2:
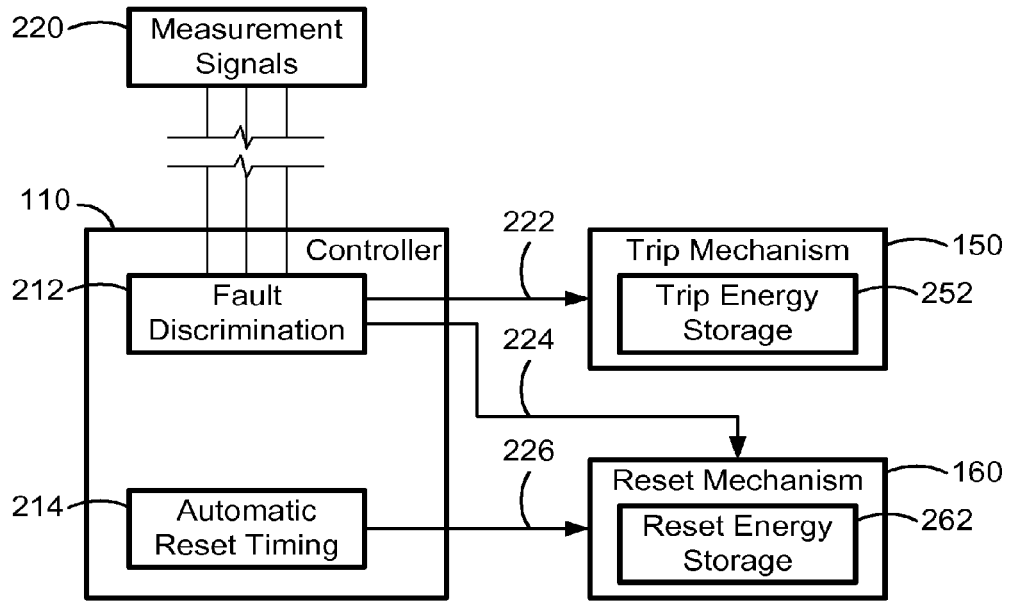
FIG. 2 provides a block diagram of an electronic protection device including a reset mechanism.

FIG. 2 provides a block diagram of an electronic protection device 100' including a reset mechanism 160. The electronic protection device 100' is similar to the electronic protection device 100 shown in FIG. 1. The controller 110 includes a fault discrimination module 212 and an automatic reset timing module 214. The modules 212, 214 can be in the form of machine-readable instructions stored on a non-transitory medium or media, such as a memory incorporated in the controller 110 or operatively coupled to the controller 110. The electronic protection device 100' includes the trip mechanism 150 and the reset mechanism 160. The trip mechanism 150 includes a trip energy storage device 252, such as a capacitor. The trip energy storage device 252 can store energy for causing the trip mechanism 150 to be actuated responsive to a trip signal 222. The reset mechanism 160 includes a reset energy storage device 262. The reset energy storage device 262 can store energy for causing the reset mechanism 160 to be actuated responsive to a reset signal 224. Actuating the trip mechanism 150 can be referred to as tripping the electronic protection device 100'. Tripping the trip mechanism 150 causes the protected load 140 to be disconnected from the power source 130 and can be carried out by separating electrical contacts in the trip mechanism 150, which causes the separation of contacts within the contactor 145 that supply current between the power source 130 and the protected load 140. In contrast, actuating the reset mechanism 160 causes the contactor 145 to be reset such that the protected load 140 is reconnected to the power source 130 and can be carried out by energizing an actuator coil that causes the electrical contacts of the contactor 145 to be reconnected, thereby reconnecting the protected load 140 to the power source 130.

The fault discrimination module 212 is connected to the trip mechanism 150 for providing the trip signal 222 to the trip mechanism 150. The fault discrimination module 212 is also connected to the reset mechanism 160 for providing the reset signal 224 to the reset mechanism 160. The fault discrimination module 212 can also be connected to the automatic reset timing module 214. The automatic reset timing module 214 can be a device configured to provide an automatic reset signal 226 to the reset mechanism 160 following actuation of the trip mechanism 150 after a time delay.

In an example operation of the electronic protection device 100', the controller 110 receives measurement signals from sensors monitoring an electrical characteristic of the power supplied to the protected load 140. The measurement signals 220, indicative of the electrical characteristic measured by the sensors (121, 122, 123), are analyzed in the fault discrimination module 212 to determine whether a fault condition has occurred. The fault discrimination module 212 is further configured to discriminate a type of fault condition according to conventional techniques employed in the art of power systems monitoring. In an implementation, the type of the fault condition can be discriminated similarly to the operation of the discussion of fault detection and discrimination of the controller in connection with FIG. 1. The type of fault condition can be discriminated based on comparisons between multiple phases of the supplied current, on trends in the measurements over time, and on comparisons between the phases and one or more threshold values, as well as based on other techniques employed in the art of power systems monitoring.

Furthermore, the fault discrimination module 212 can be configured to determine whether the discriminated fault condition is a type of fault condition calling for an automatic reset. For example, the fault discrimination module 212 can be configured to determine that a thermal fault is a type of fault calling for an automatic reset, while other types of fault do not call for automatic resets. The fault discrimination module 212 is further configured to signal one or more of the trip mechanism 150 and the reset mechanism 160 depending on the determination of whether the discriminated fault condition calls for an automatic reset.

In a configuration, if the fault discrimination module 212 determines that an automatic reset is called for, then the fault discrimination module 212 is configured to not suppress an automatic reset function of the electronic protection device 100'. The automatic reset function of the electronic protection device 100' can optionally be carried out by the fault discrimination module 212 first signaling the automatic reset timing module 214 and then tripping the trip mechanism 150. The automatic reset timing module 214 can be a circuit configured to provide the automatic reset signal 226 to the reset mechanism 160 following the tripping of the trip mechanism 150 after a time delay. In an example, the time delay of the automatic reset timing module can be thirty seconds, one minute, or can be set by a user according to requirements of the protected load 140. In a configuration where the fault discrimination module is configured to signal the automatic reset timing module, by signaling the automatic reset timing module 214 before tripping the trip mechanism 150, the automatic reset timing module 214 can begin timing the time delay just before the trip event occurs. In an implementation, the automatic reset timing module 214 can begin timing the time delay responsive to the trip event occurring without being signaled by the fault discrimination module 212.

In a configuration, if the fault discrimination module 212 determines that an automatic reset is not called for, then the fault discrimination module is configured to suppress the automatic reset function. The automatic reset function is suppressed by the fault discrimination module 212 actuating the reset mechanism 160 shortly before actuating the trip mechanism 150. Actuating the reset mechanism 160 discharges the reset energy storage device 262 within the reset mechanism 160. In an implementation where the electronic protection device 100' is self-powered from a rectified secondary winding of a current transformer coupled to the monitored current, the reset energy storage device 262 is not recharged while the monitored circuit is tripped, because no current flows through the current transformer. By discharging the reset energy storage device 262 just before actuating the trip mechanism 150, the reset energy storage device 262 does not recharge sufficiently to energize the reset mechanism 160 responsive to a subsequent signal from the automatic reset timing module 214. In an implementation, the time delay between the actuation of the reset mechanism 160 and the actuation of the trip mechanism 150 can be milliseconds, and can be less than ten milliseconds, less than twenty milliseconds, or less than fifty milliseconds.

FIG. 3 illustrates a block diagram of an electronic protection device 100" providing a selective automatic reset function and including a reset mechanism transistor 366 and a trip mechanism transistor 356. The electronic protection device 100" is similar to the electronic protection device 100' illustrated in FIG. 2, except that the electronic protection device 100" includes a reset circuit to operate the reset mechanism 160 (FIG. 2) and a trip circuit to operate the trip mechanism 150 (FIG. 2). The controller 110 of the electronic protection device 100" can optionally further include a trip transistor control 316 and a reset transistor control 318. The trip transistor control 316 can be a module for providing the trip signal 222 based on a signal from the fault discrimination module 212. The trip signal 222 can be a proper biasing voltage to the trip transistor 356. The reset transistor control 318 can be a module for providing the reset signal 224 to the reset mechanism 160 based on signals from the fault discrimination module 212 or the automatic reset timing module 214. The reset signal 224 can be a proper biasing voltage to the reset transistor 366.

In an implementation, the electronic protection device 100" can be an automatic reset discrimination circuit. In an implementation, the trip mechanism 150 includes a trip circuit including a trip capacitor 352, a trip actuator coil 354, and a trip transistor 356. The trip capacitor 352 and the trip actuator coil 354 are connected in series by connecting a first terminal of the trip actuator coil 354 and a first terminal of the trip capacitor 352. The trip transistor 356 is connected between a second terminal of the trip actuator coil 354 and a second terminal of the trip capacitor 352, and a gate terminal of the trip transistor can be connected to the trip transistor control 316. In an implementation, the reset mechanism includes a reset circuit including a reset capacitor 362, a reset actuator coil 364, and a reset transistor 366. The reset capacitor 362 and the reset actuator coil 364 are connected in series by connecting a first terminal of the reset actuator coil 364 and a first terminal of the reset capacitor 364. The reset transistor 366 is connected between a second terminal of the reset actuator coil 364 and a second terminal of the reset capacitor 362. The reset circuit can be advantageously designed to allow for the reset capacitor 362 to rapidly discharge through the reset actuator coil 364 when the reset transistor 366 receives the reset signal 224. For example, the reset capacitor 362 can be configured to substantially discharge in less than five milliseconds, or in less than ten milliseconds.

The trip actuator coil 354 can be a winding of a solenoid and the solenoid can be configured to open one or more contacts to separate the load 140 from the power source 130 responsive to the trip capacitor 352 discharging through the trip actuator coil 354. Similarly, the reset actuator coil 364 can be a winding of another solenoid and the other solenoid can be configured to close one or more contacts to reconnect the load 140 from the power source 130 responsive to the reset capacitor 362 discharging through the reset actuator coil 364. In an implementation, the automatic reset discrimination circuit can be configured such that the reset actuator coil 364 and the trip actuator coil 354 are the same coil with current flowing in opposite directions through the coil for providing the trip actuation and the reset actuation. Providing current in opposite directions can drive a solenoid in opposite directions.

In an implementation where the automatic reset discrimination circuit is self-powered from a rectified secondary winding of a current transformer coupled to the monitored current, the reset circuit can be further configured for the reset capacitor 362 and the trip capacitor 352 to be charged by a DC power supply of the self-powered automatic reset discrimination circuit. The reset circuit can be configured such that discharging the reset capacitor 362 through the reset actuator coil 364 when the reset capacitor 362 is insufficiently charged does not cause the reset actuator coil 364 to actuate and provide the resetting of the contacts to reconnect the load 140 to the power source 130. Causing the reset capacitor 362 to be insufficiently charged before the reset circuit receives the reset signal 224 from the reset transistor control 318 can be referred to as suppressing or inhibiting the reset function of the automatic reset discrimination circuit. In an implementation, the reset capacitor 362 can be considered to be recharged when it holds a charge greater than an insufficient charge.

In an implementation, the reset energy storage device 262 can be implemented as the reset capacitor 362 or as multiple capacitors. The reset capacitor 362 can be configured to charge from a rectified secondary winding of a current transformer that is providing DC power to a self-powered electronic protection device. The reset capacitor 362 can be selected to have a capacitance according to a desired characteristic charging time, discharging time, and maximum charge. The desired characteristic charging time can also be influenced by selecting resistance values connected in series with the reset capacitor 362 and the DC power supply of the self-powered device as is appreciated in the art of power systems monitoring and circuit design. The characteristic charging time can also be described by an exponential charging profile. Aspects of the reset circuit can be selected such that the reset capacitor 362 is insufficiently charged after the reset transistor control 318 provides the reset signal 224 and the trip transistor control 316 provides the trip signal 222 after a time delay. The capacitance of the trip capacitor 352, or multiple capacitors providing the function of the trip capacitor 352, can be selected according to similar consideration of desired characteristic charging time, discharging time, and maximum charge.

Figure 4:
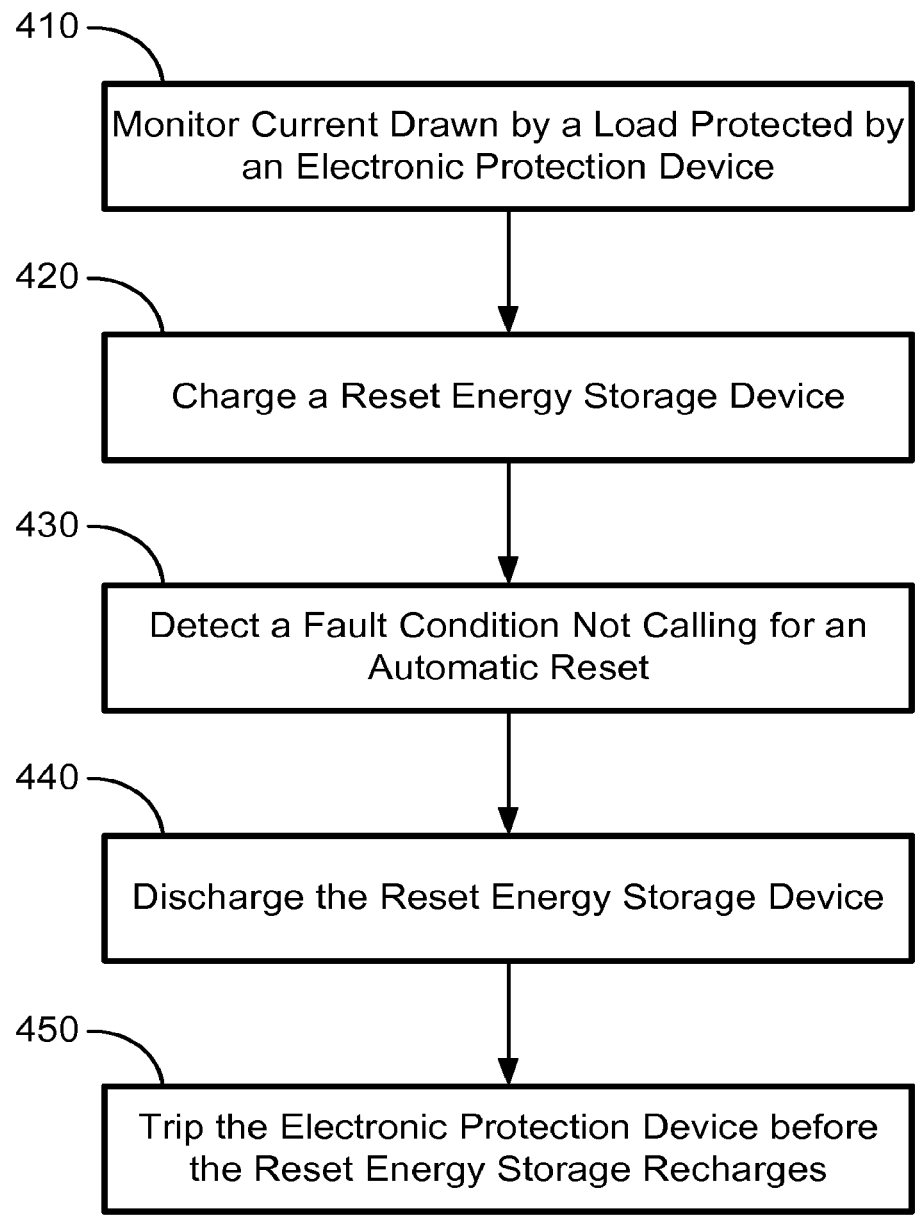
FIG. 4 provides a flowchart demonstrating a method of suppressing an automatic reset function of an electronic protection device.

FIG. 4 provides a flowchart demonstrating an example method of suppressing an automatic reset function of an electronic protection device. Reference will also be made to aspects in FIGS. 1 through 3 to clarify the method illustrated in FIG. 4. In an electronic protection device 100, electrical characteristics of power associated with a protected load 140 connected to a power source 130 are monitored (410). The monitored electrical characteristic can be current drawn from each phase of current supplied by a polyphase power source, and the protected load can be an inductive motor such as an inductive motor configured to operate from a three phase power source. While the electronic protection device 100 is monitoring the electrical characteristic drawn by the load 140, a reset energy storage device 262 is charged (420). The reset energy storage device 262 can be one or more capacitors and can be charged by connection with a DC power supply that is part of the self-powered electronic protection device. The monitored electrical characteristic, such as, for example, the current drawn by the protected load 140 is analyzed in the controller 110 to detect a fault condition not calling for an automatic reset (430). In an implementation of the present disclosure, the controller can continue to analyze the monitored electrical characteristic until a fault condition not calling for an automatic reset is detected (430). Responsive to the detecting the fault condition (430), the automatic reset function of the electronic protection device 100 is suppressed by: discharging the reset energy storage device 262 (440), and tripping the electronic protection device 100 before the reset energy storage device 262 has time to recharge (450).

Figure 5:
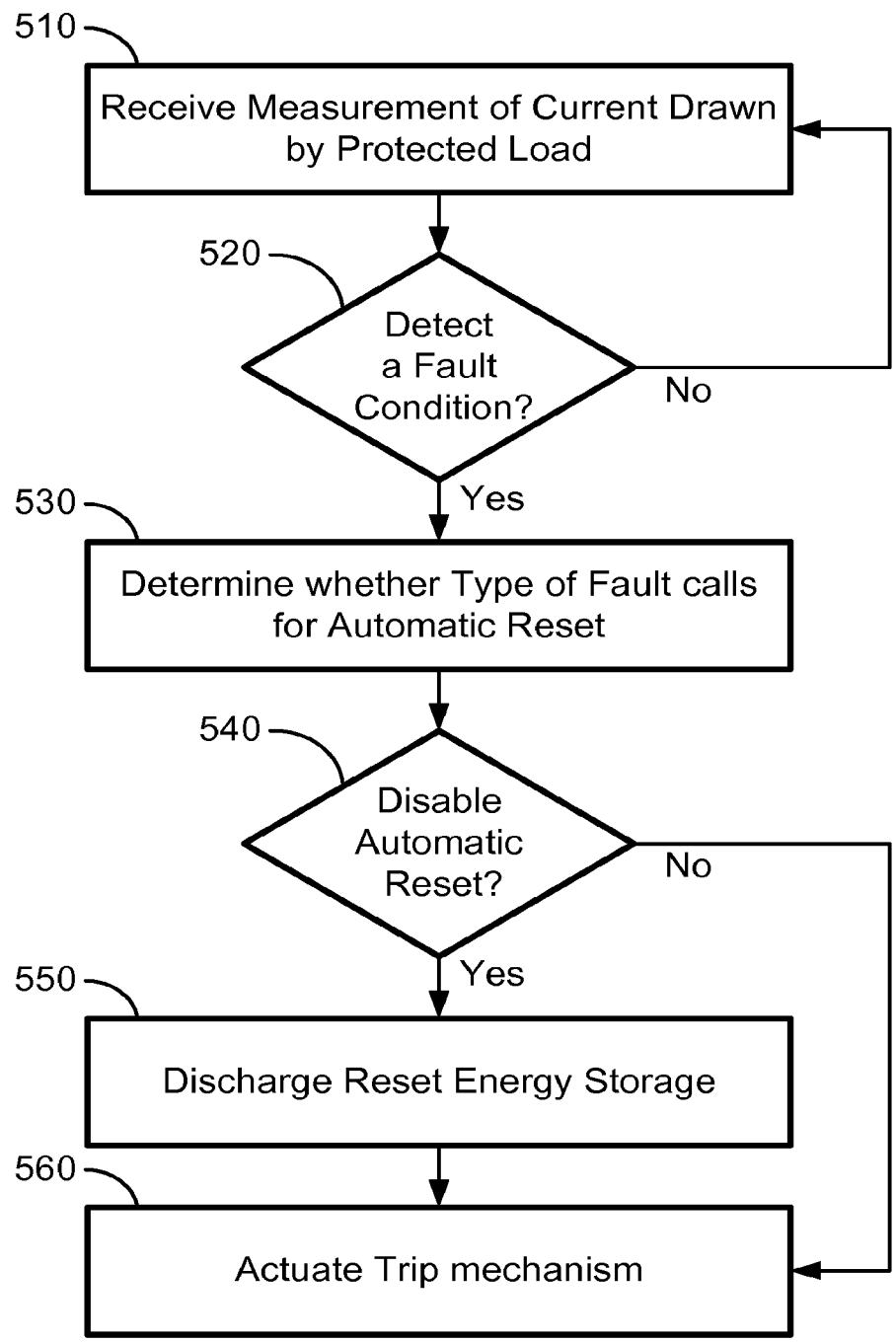
FIG. 5 provides a flowchart illustrating a method of operating the electronic protection device to selectively automatically reset the electronic protection device.

FIG. 5 provides a flowchart illustrating an example method of operating the electronic protection device 100 to selectively automatically reset the electronic protection device 100. In operation, the controller 110 of the electronic protection device 100 receives measurements of current drawn by the protected load 140 or associated voltage measurements (510). The measurements are analyzed in the controller 110 to detect a fault condition (520). If a fault condition is not detected, current or voltage measurements continue to be received (520) and analyzed to detect a fault condition (520). If a fault condition is detected, a determination of the type of fault condition is made (530). The detection of the fault condition (520) and the determination of the type of fault condition (530) can both be carried out within the fault discrimination module 212 in the controller 110. The controller 110 determines whether the type of fault condition detected is a type calling for an automatic reset condition (530). Based on the determination of whether the type of detected fault condition calls for an automatic reset (530), the controller 110 determines whether to disable the automatic reset function (540). If the detected fault condition is determined to be a type calling for an automatic reset, the trip mechanism is actuated (560). If the detected fault condition is not determined to be a type calling for an automatic reset, the reset energy storage device 262 is discharged (550) just before the trip mechanism 150 is actuated (560). For example, the time delay between discharging the reset energy storage device 262 (550) and actuating the trip mechanism 150 (560) can be a few milliseconds and can be less than ten milliseconds. The reset energy storage device 262 can be discharged by actuating the reset mechanism 160 so as to discharge the reset energy storage device 262 through the reset actuator coil 364.

Aspects of the present disclosure provide an apparatus configured to selectively automatically reset an electronic protection device while requiring minimal cost, complexity, and current consumption to implement. The methods disclosed herein do not require the addition of any electronic components to be implemented in an automatically resetting electronic protection device. Aspects of the present disclosure can be implemented in a solid state overload relay operated according to a controller. The controller is configured to monitor current drawn by a protected load from an AC three-phase power source.

While particular implementations and applications of the present disclosure have been illustrated and described, it is to be understood that the present disclosure is not limited to the precise construction and compositions disclosed herein and that various modifications, changes, and variations can be apparent from the foregoing descriptions without departing from the spirit and scope of the invention as defined in the appended claims.

What is claimed is:

1. An automatic reset discrimination circuit for automatically discriminating whether to automatically reset an electronic protection device following a tripping of the electronic protection device, the circuit comprising:
   a trip mechanism that, when actuated, trips the electronic protection device, disconnecting a load protected by the electronic protection device from a power source;
   a reset circuit including a reset mechanism and a reset energy storage device, the reset mechanism including a reset actuator coil that, when actuated, causes the reset mechanism to reset the electronic protection device thereby reconnecting the load to the power source, the reset energy storage device being connected to the reset actuator coil; and a controller having a reset control output connected to the reset circuit, the controller being configured to cause the reset circuit to actuate or, in response to detection of a fault condition not calling for an automatic reset of the electronic protection device, cause the reset energy storage device to discharge to prevent the reset circuit from automatically resetting the electronic protection device, wherein the controller further includes a fault discrimination module for analyzing measurement signals indicative of an electrical characteristic of power drawn by the load from a plurality of current phases by the power source, and wherein the detection of the fault condition not calling for an automatic reset is carried out by the fault discrimination module that is configured to:

analyze the measurement signals to detect a fault condition, discriminate a type of the fault condition, and determine whether to prevent the reset circuit from automatically resetting based on the discriminated type of the fault condition.

2. The automatic reset discrimination circuit of claim 1, wherein the reset energy storage device discharges through the reset actuator coil.

3. The automatic reset discrimination circuit of claim 1, wherein the reset circuit is prevented from automatically resetting the electronic protection by actuating the trip mechanism responsive to the discharge of the reset energy storage device before the reset energy storage device is recharged with an amount of energy sufficient to actuate the reset actuator coil.

4. The automatic reset discrimination circuit of claim 1, wherein the reset circuit further includes a reset transistor having a gate, the gate of the reset transistor being connected to the reset control output of the controller, the controller being configured to cause the reset energy storage device to discharge through the reset actuator coil by biasing the gate of the reset transistor.

5. The automatic reset discrimination circuit of claim 1, wherein the reset actuator coil is also an actuator coil of the trip mechanism, the trip mechanism being configured to actuate upon discharge of a trip energy storage device through the reset actuator coil such that current flows in a direction opposite to a direction of current flow through the reset actuator coil during the discharge of the reset energy storage device.

6. The automatic reset discrimination circuit of claim 1, wherein the reset circuit is prevented from automatically resetting the electronic protection by actuating the trip mechanism responsive to the discharge of the reset energy storage device before the reset energy storage device is recharged with an amount of energy sufficient to actuate the reset actuator coil.

7. The automatic reset discrimination circuit of claim 1, wherein the reset circuit further includes a reset transistor having a gate, the gate of the reset transistor being connected to the reset control output of the controller, the controller being configured to cause the reset energy storage device to discharge through the reset actuator coil by biasing the gate of the reset transistor.

8. The automatic reset discrimination circuit of claim 1, wherein the reset actuator coil is also an actuator coil of the trip mechanism, the trip mechanism being configured to actuate upon discharge of a trip energy storage device through the reset actuator coil such that current flows in a direction opposite to a direction of current flow through the reset actuator coil during the discharge of the reset energy storage device.

9. A method of operating a selectively automatically resetting electronic protection device, the method comprising:

monitoring a characteristic of electricity associated with a load protected by the electronic protection device;

charging a reset energy storage device configured to supply energy to a reset mechanism configured to automatically reset the electronic protection device;

detecting a fault condition based on the monitored characteristic;

analyzing the monitored characteristic to determine whether the fault condition calls for an automatic reset of the electronic protection device or does not call for an automatic reset of the electronic protection device;

discharging the reset energy storage device responsive to the fault condition not calling for an automatic reset of the electronic protection device; and responsive to the discharging, causing the electronic protection device to trip before the reset energy storage device is recharged, thereby preventing an automatic resetting of the electronic protection device, wherein the analyzing the monitored characteristic comprises:

discriminating a type of the fault condition, and determining whether to prevent the reset mechanism from automatically resetting the electronic protection device based on the discriminated type of the fault condition.

10. The method of claim 9, wherein the characteristic is current and wherein the monitoring is carried out by measuring current drawn by the load from a plurality of phases of a polyphase alternating current (AC) electrical source.

11. The method of claim 10, wherein the reset energy storage device is a capacitor, wherein the reset mechanism includes a reset actuator coil through which the reset energy storage device discharges, and wherein the discharging is carried out by closing a switch that completes a circuit that includes the capacitor and the reset actuator coil to cause the energy stored in the reset energy storage device to discharge through the reset actuator coil.

12. The method of claim 10, further comprising automatically resetting the electronic protection device by using the energy stored in the reset energy storage device responsive to the fault condition calling for an automatic reset of the electronic protection device.

13. The method of claim 9, wherein the electronic protection device is a self-powered solid state overload relay.

14. The method of claim 9, wherein the reset energy storage device is a capacitor, and wherein the reset mechanism includes a reset actuator coil through which the reset energy storage device discharges.

15. The method of claim 14, wherein the discharging is carried out by closing a switch that completes a circuit that includes the capacitor and the reset actuator coil to cause the energy stored in the reset energy storage device to discharge through the reset actuator coil.

16. The method of claim 9, wherein the fault condition not calling for an automatic reset is a phase loss fault condition.

17. The method of claim 9, wherein the fault condition not calling for an automatic reset is a phase imbalance fault condition.

18. The method of claim 9, further comprising automatically resetting the electronic protection device by using the energy stored in the reset energy storage device responsive to the fault condition calling for an automatic reset of the electronic protection device.

19. The method of claim 15, wherein the causing the electronic protection device to trip is carried out by closing a second switch that causes an actuator coil to actuate a trip mechanism of the electronic protection device using energy stored in a trip energy storage device.

* * * * *